May 5, 1936. F. E. NORTON 2,039,550
SWITCH BOX
Filed Sept. 10, 1934
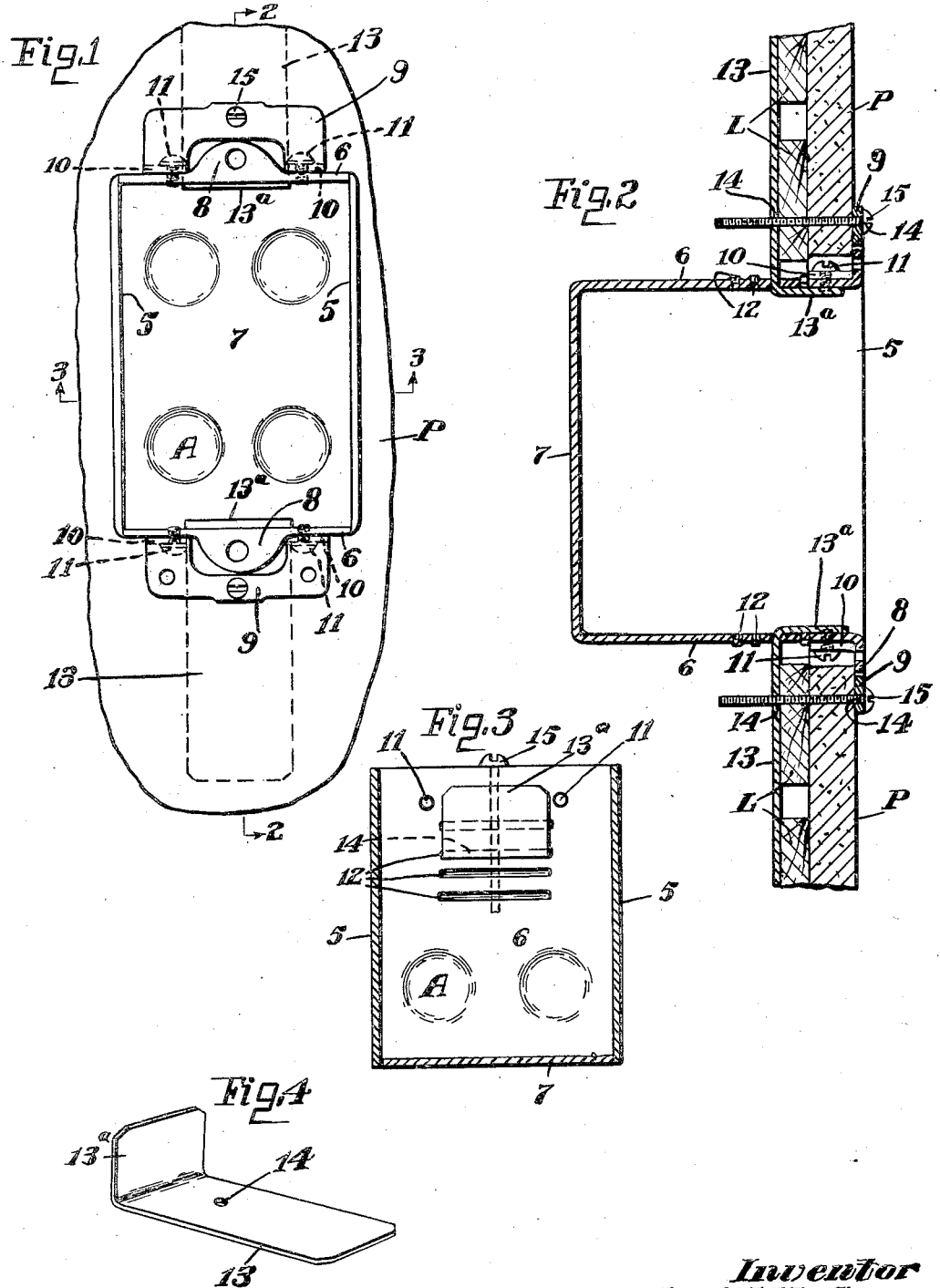
Inventor
Fred E. Norton
By Attorney Patented May 5, 1936

2,039,550

UNITED STATES PATENT OFFICE 2,039,550

SWITCH BOX

Fred E. Norton, Kennebunk, Maine

Application September 10, 1934, Serial No. 743,387

8 Claims. (Cl. 247—21)

This invention relates to improvements in switch boxes and like units to be mounted in walls.

Electricians generally experience considerable difficulty in installing switch boxes in walls because of the lack of an adequate support. Adjacent available wall and ceiling structure relied upon for the necessary support includes plaster reenforcements such as lathes which show a uniform tendency to split under the strain of wood screws. Sometimes the support is wallboard and in more modern buildings the reenforcement may be wire or steel lathing. Regardless of the wall structure, the installation of such units as switch boxes and devices to be supported thereby has been accompanied by the problem of firmly securing the box.

My invention is particularly adapted to overcome these and suggested problems, for my invention includes clamping portions which while permitting desired anchorage bear on broad enough surfaces to give adequate support for the box with all types of wall structures. I am thus able not only to overcome these problems but also to facilitate greatly switch box installation.

In the drawing I have shown and in the specification described a simple embodiment of my invention. In the drawing:—

Fig. 1 is a plan view of my switch box mounted on a wall.

Fig. 2 is a cross section view along the lines 2—2, of Fig. 1.

Fig. 3 is a view along the lines 3—3 of Fig. 1, and

Fig. 4 shows the detachable clamp member.

I have indicated in Figs. 1 and 2 a wall which typically includes a layer of plaster P reenforced as by lathes L through which wall an opening has been cut to receive the switch box.

The switch box may obviously be shaped as desired and consists of a casing having side walls 5, end walls 6 and a rear wall 7, the front of the casing being open. Each of the end walls 6 is provided with an apertured ear 8 bent at right angles to the end walls 6 to receive a cover plate (not shown). The walls typically include "knock outs" indicated at A (see Figs. 1 and 3).

I provide a plate 9 shaped to fit over the ear 8 to lie against the outer surface of the wall and formed with a flange portion 10 which is secured to the end walls 6 as by the screws 11. I may also make plate 9 include cover plate receiving apertures and form it integrally with the side walls 6.

I provide the side wall 6 with one or more aligned parallel slots 12 spaced from the ear 8 to correspond to varying wall thicknesses. The slots 12 are preferably formed as "knock outs". The members 13 are adapted to be inserted through whichever of the slots 12 corresponds to the thickness of the wall and include a portion 13a adapted to bear against the side walls 6. The members 13 and the plate 9 are provided with aligned apertures 14 so that the members 13 and the plate 9 may be interlocked as by the screw 15 which is inserted after a hole has been drilled through the lathe L.

I have not shown in detail the construction of my switch box. With my invention it is possible to mount a switch box or like unit easily and securely in any wall for the clamp portions particularly the member 13, bear against a large enough area to overcome the structural weakness or a lack of adequate support for such units as switch boxes in all walls and ceilings.

What I therefore claim and desire to secure by Letters Patent is:—

1. An open front switch box to be mounted in walls, said box consisting of side and rear walls, a plate adapted to be secured to desired side walls to overlie the outer surface of adjacent wall structure, said side walls having a plurality of aligned parallel slots representing with said plate wall structures of different thicknesses, a member adapted to extend through said slots and to lie against the inner surface of said wall structure, said member including a portion adapted to bear against the inner surface of said side walls, said member and said plate having when thus assembled aligned apertures, and means to interlock said member and said plate.

2. An open front switch box to be mounted in walls, said box consisting of side and rear walls, said side walls including a flange to overlie the outer surface of adjacent wall structure, said side walls having a plurality of aligned parallel slots representing with said flange wall structures of different thicknesses, a member adapted to extend through said slots and to lie against the inner surface of said wall structure, said member including a portion adapted to bear against the inner surface of said side walls, said member and said flange having when thus assembled aligned apertures, and means to interlock said member and said flange.

3. A clamp for units to be installed in walls and ceilings, said clamp including a plate to be secured to said unit to overlie adjacent wall structure, and a member adapted to pass through slots formed in said units and to lie against the inner surface of said wall structure, said member having a portion adapted to bear against the interior of said unit, said member and said plate having apertures aligned when assembled and means to interlock said plate and said member.

4. An open front unit to be inserted in walls said unit consisting of side and rear walls, said side walls including a member adapted to bear against the outer surface of adjacent wall structure, an aperture in said side walls, a second member adapted to pass through said aperture, said member having a portion adapted to bear against the interior of said unit, said members having aligned apertures when assembled and means to interlock said members against both surfaces of the adjacent wall structure.

5. An open front unit to be inserted in walls said unit consisting of side and ear walls, said side walls including a member adapted to bear against the outer surface of adjacent wall structure, an aperture in said side walls, a second member adapted to pass through said aperture, said member having a portion adapted to bear against the interior of said unit, said members having aligned apertures when assembled and means to interlock said members against both surfaces of the adjacent wall structure, said second member being relatively larger than said first named member whereby an adequate clamp support is provided on the unexposed surface of said wall structure.

6. An open front unit to be mounted in walls, said unit consisting of side and rear walls, a member adapted to be secured to the side walls of said unit and shaped to bear against the outer surface of adjacent wall structure, an aperture in said side walls, a second member adapted to pass through said aperture, said member having a portion adapted to bear against the interior of said unit, said members having aligned apertures when assembled and means to interlock said member against both surfaces of the adjacent wall structure.

7. An open front unit to be mounted in walls, said unit consisting of side and rear walls, a member adapted to be secured to the side walls of said unit and shaped to bear against the outer surface of adjacent wall structure, an aperture in said side walls, a second member adapted to pass through said aperture, said member having a portion adapted to bear against the interior of said unit, said members having aligned apertures when assembled and means to interlock said member against both surfaces of the adjacent wall structure, said second member being relatively larger than said first named member whereby an adequate clamp support is provided on the unexposed surface of said wall structure.

8. A box to be mounted in walls, said box consisting of side and rear walls, flanges secured to desired side walls, said side walls having a plurality of aligned parallel slots representing with said flanges, wall structures of different thicknesses, members adapted to be inserted through said slots to bear against the inside wall structure, each of said members including a portion adapted to bear against the inner surface of said side walls, said members and said flanges having when thus assembled aligned apertures, the aperture in said member being threaded to permit said flange and said member to be interlocked through and against said wall and said members being of sufficient length to insure desired contact with said inside wall structure.

FRED E. NORTON.